United States Patent [19]

Larson et al.

[11] 4,155,659
[45] May 22, 1979

[54] PRINTING AND CODING MACHINE

[75] Inventors: Edward S. Larson; Carl A. Levin; Rolf A. Thienemann, all of Chicago, Ill.

[73] Assignee: The United States of America as represented by The Secretary of the Navy, Washington, D.C.

[21] Appl. No.: 317,454

[22] Filed: Feb. 5, 1940

[51] Int. Cl.² .............................................. B41J 7/66
[52] U.S. Cl. ..................................................... 400/90
[58] Field of Search ................................. 197/4; 35/4; 400/89–90

[56] References Cited

U.S. PATENT DOCUMENTS

| | | | |
|---|---|---|---|
| 1,504,576 | 8/1924 | Pope | 197/13 |
| 1,657,411 | 1/1928 | Scherbius | 197/4 |
| 1,861,857 | 6/1932 | Hebern | 197/4 |
| 1,940,155 | 12/1933 | Thompson | 197/107 |
| 2,116,683 | 5/1938 | Lemmon et al. | 197/4 |
| 2,116,731 | 5/1938 | Noll | 197/4 |
| 2,116,733 | 5/1938 | Noll | 197/4 |
| 2,255,030 | 9/1941 | Tholstrup | 197/107 |

Primary Examiner—Stephen C. Bentley
Attorney, Agent, or Firm—John R. Utermohle

EXEMPLARY CLAIM

1. A ciphering unit, and a printing unit having type bars movable to print the characters carried therby, an electromagnet individual to each said type bar to select the respective type bar for operation when such magnet is energized; said ciphering unit comprising driving means adapted to function in discrete cycles, a plurality of character keys, means operable by any one of said keys to initiate a functioning cycle of said driving means, an individual electric circuit closing means operable by each said key, a plurality of individually movable elements establishing variable random electric circuits equal in number to the number of said keys, each of said circuits being connected between some one of said circuit closing means and some one of said electromagnets, a switch settable to connect said circuits for flow of current therethrough in one direction for enciphering and in the opposite direction for deciphering, means individual to each said element to actuate such element sporadically to change said circuits, means separately controllable by actuation of each individual means to condition another of said individual means for operation, a common swingable bail actuated by said driving means to operate such of said individual means as are conditioned for operation, means controlled by said driving means common to all said keys to hold a key depressed until a type bar has been actuated and to prevent depression of any other key during that time, means operated by all of said keys to effect operating connection between said driving means and the instrumentalities actuated thereby, a member movable to lock said keys against depression, means responsive to the conditioning of said individual means to move said key locking member to the locked position when none of said individual means is conditioned for operation; said printing unit including means actuated to move said key locking member to the locked position when said printing unit does not operate in response to depression of a key, means operative when said switch is in the enciphering position to insert an extra space after each fifth character printed, means operable to lock said keys when a predetermined number of groups of five characters have been printed, and means operable simultaneously with the last-mentioned means to position the surface upon which said characters are printed to print a new character.

19 Claims, 20 Drawing Figures

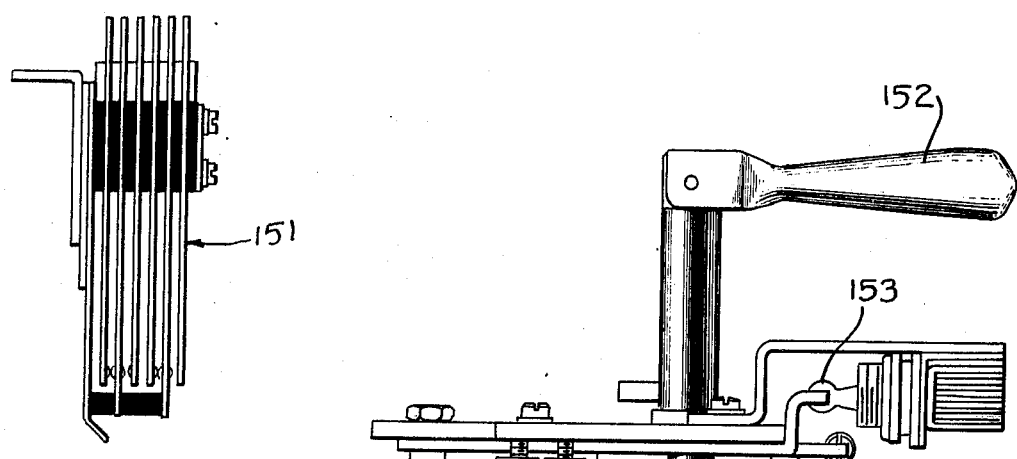
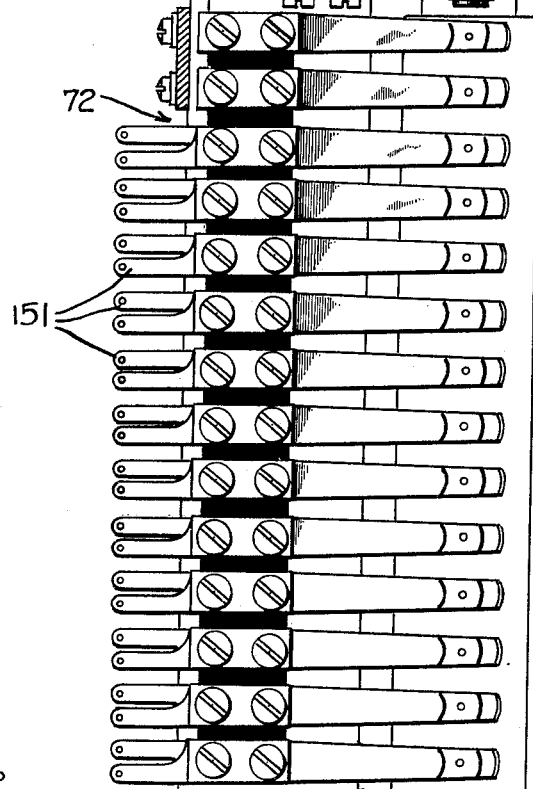
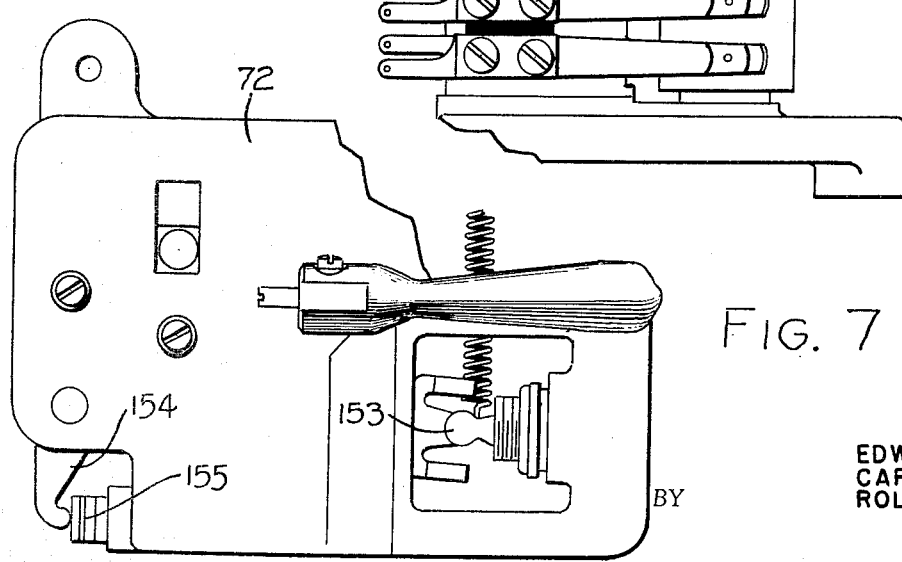
FIG. 8
FIG. 6
FIG. 7
INVENTORS
EDWARD S. LARSON
CARL A. LEVIN
ROLF A. THIENEMANN
BY
ATTORNEY.

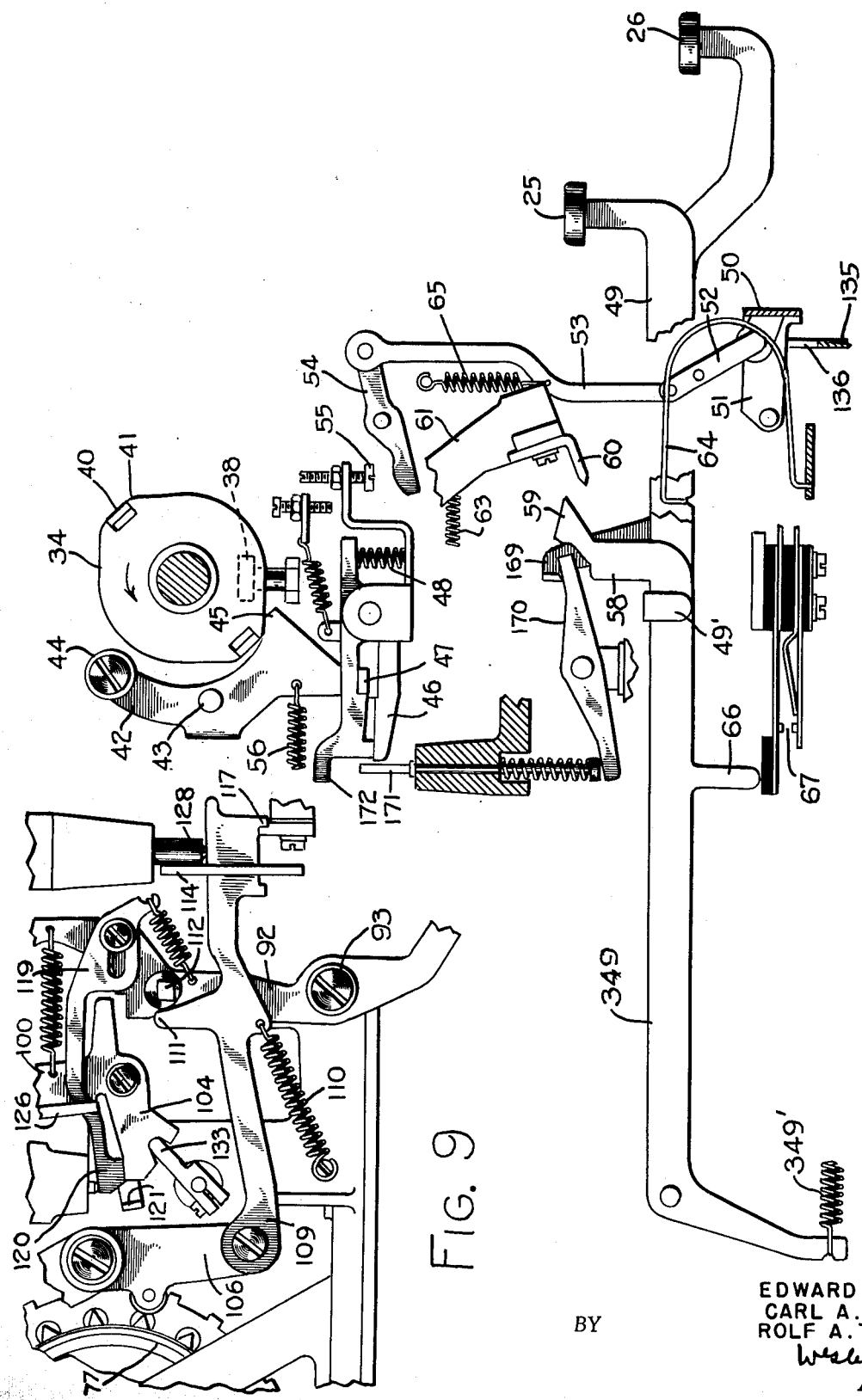

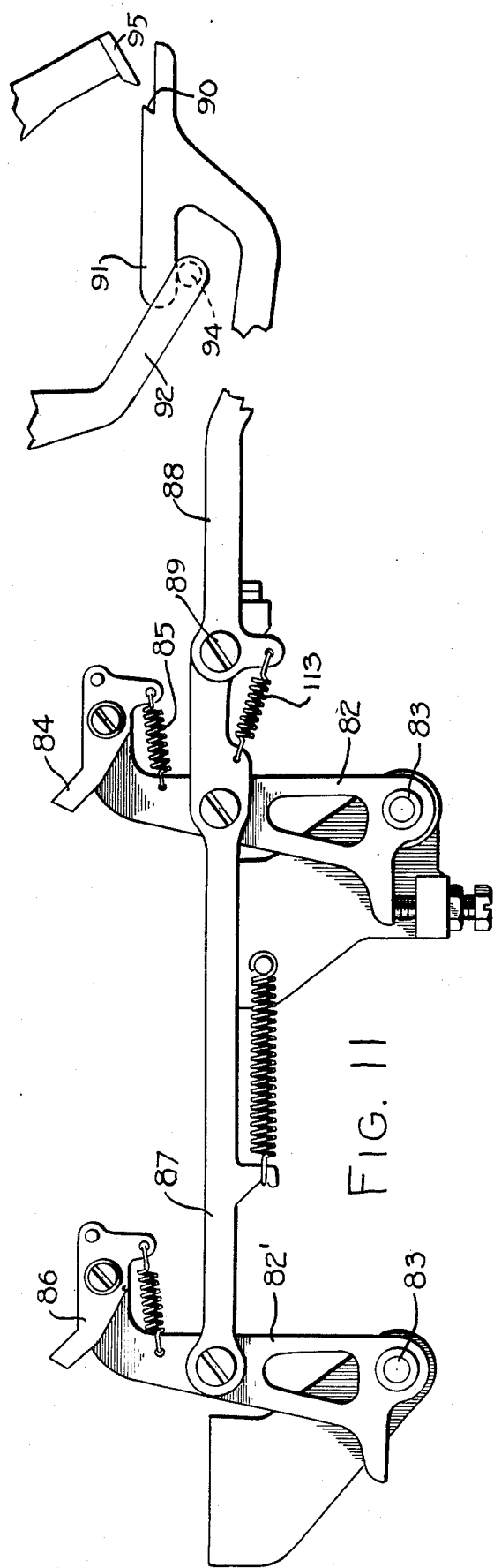
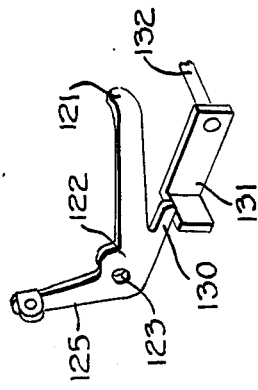
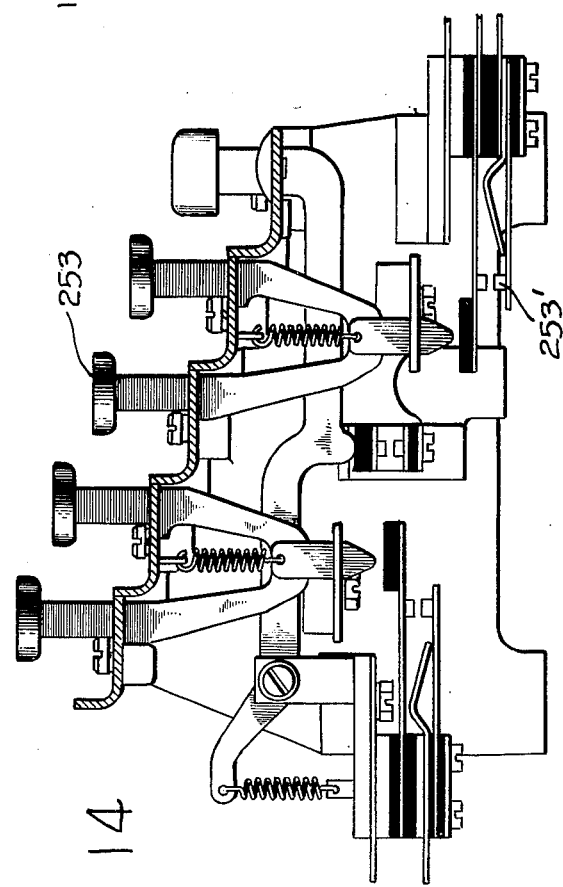
FIG. 11
FIG. 12
FIG. 14
INVENTORS
EDWARD S. LARSON
CARL A. LEVIN
ROLF A. THIENEMANN
BY
ATTORNEY.

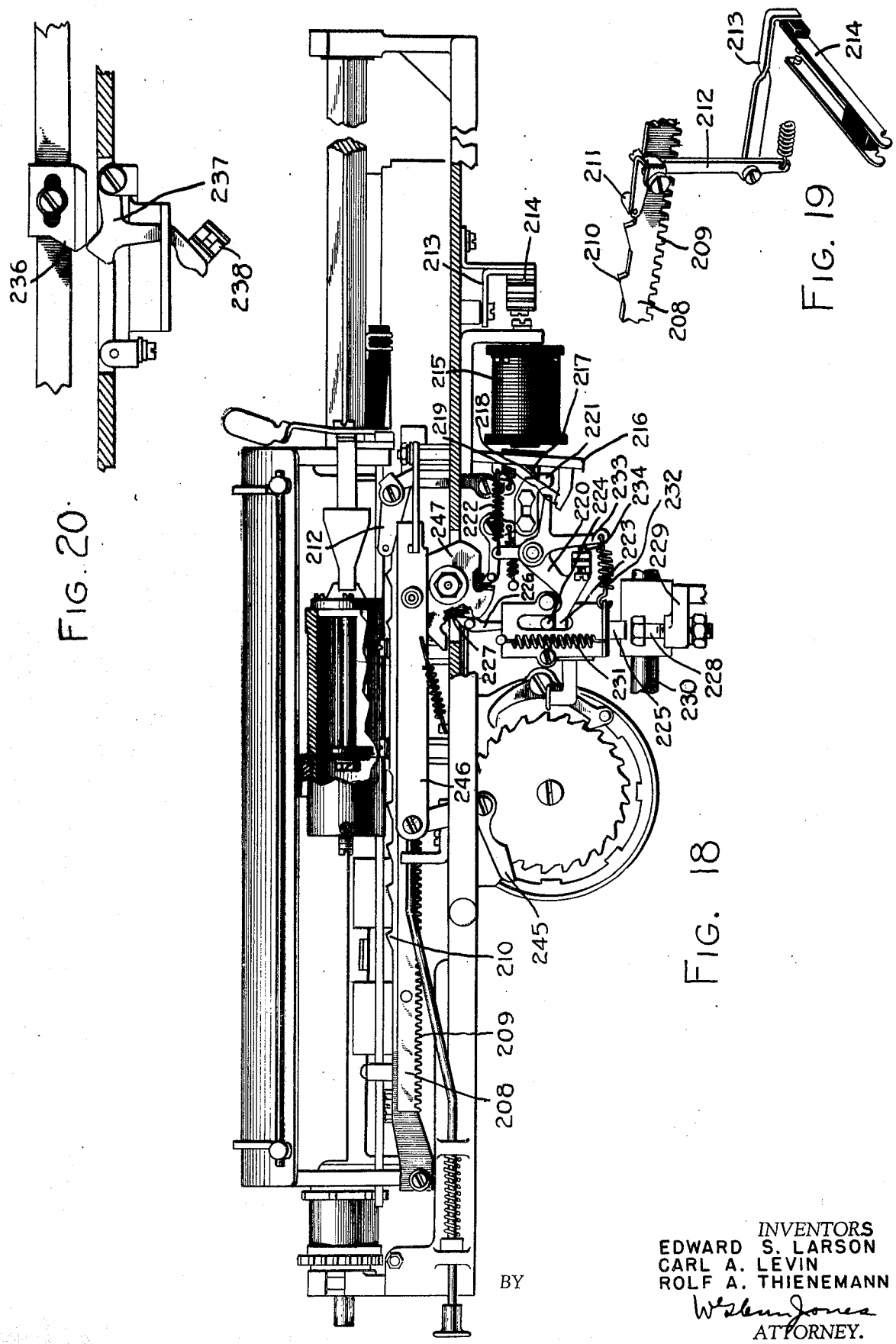

PRINTING AND CODING MACHINE

This invention relates to electrically operated coding machines to encipher and decipher messages and simultaneously print the same, and more particularly to a machine of the kind mentioned wherein random electrical circuits are sporadically changed during the enciphering and deciphering of a message.

Among the several objects of the present invention are:

to provide mechanism for enciphering messages in which the characters that are successively printed are haphazardly selected;

to provide means whereby a message enciphered as aforesaid may be accurately deciphered;

to provide means to lock automatically the keyboard of the coding unit under certain conditions;

to provide means to insert an extra space after each group of a predetermined number of characters when enciphering;

to provide means for positive mechanical operation of the various units; and to insure a change in the random electrical circuits after the printing of each character.

The manner in which the foregoing and other objects are achieved will become apparent from a perusal of the following description in connection with the accompanying drawings wherein:

Enciphering and Deciphering Unit

FIGS. 6 and 7 are respectively a side elevation and a top plan view of the multiple switch for setting the circuits in the unit for enciphering or deciphering;

FIG. 8 is a detail view of one of the contact pile-ups in the multiple switch;

FIG. 9 is a detail view showing in different positions certain elements appearing in FIG. 5;

FIG. 10 is a detail side elevation illustrating the operating connections of the keys;

FIG. 11 is an enlarged detail view of the parts connected to the push bars;

FIG. 12 is a detail of elements for transferring motion from one mechanism to trip a mechanism on the opposite side of the unit;

Printing Unit

Figure 4:
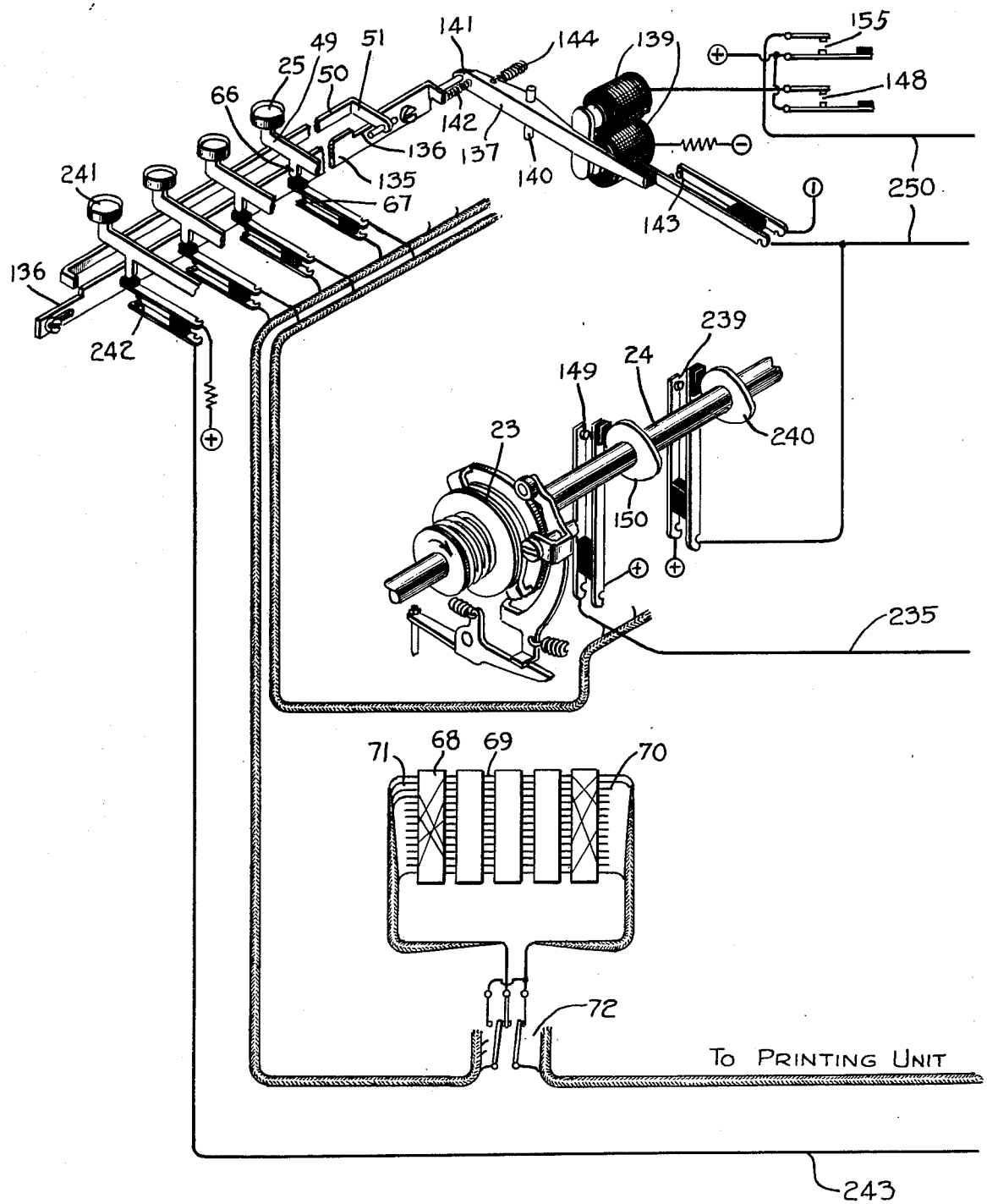
FIG. 4 is a schematic view of certain electrical circuits controlled by the keyboard and cam shaft of FIG. 1.
Figure 13:
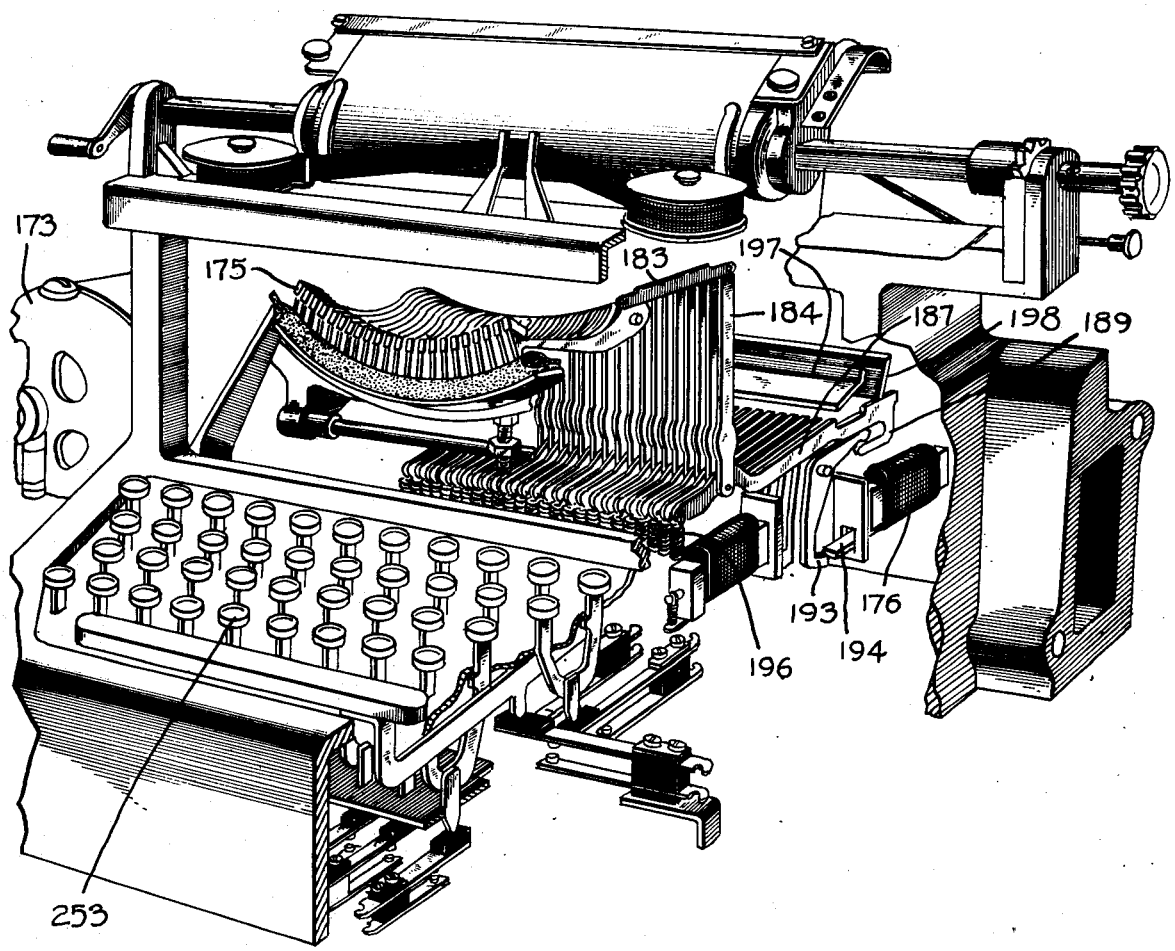
Figure 15:
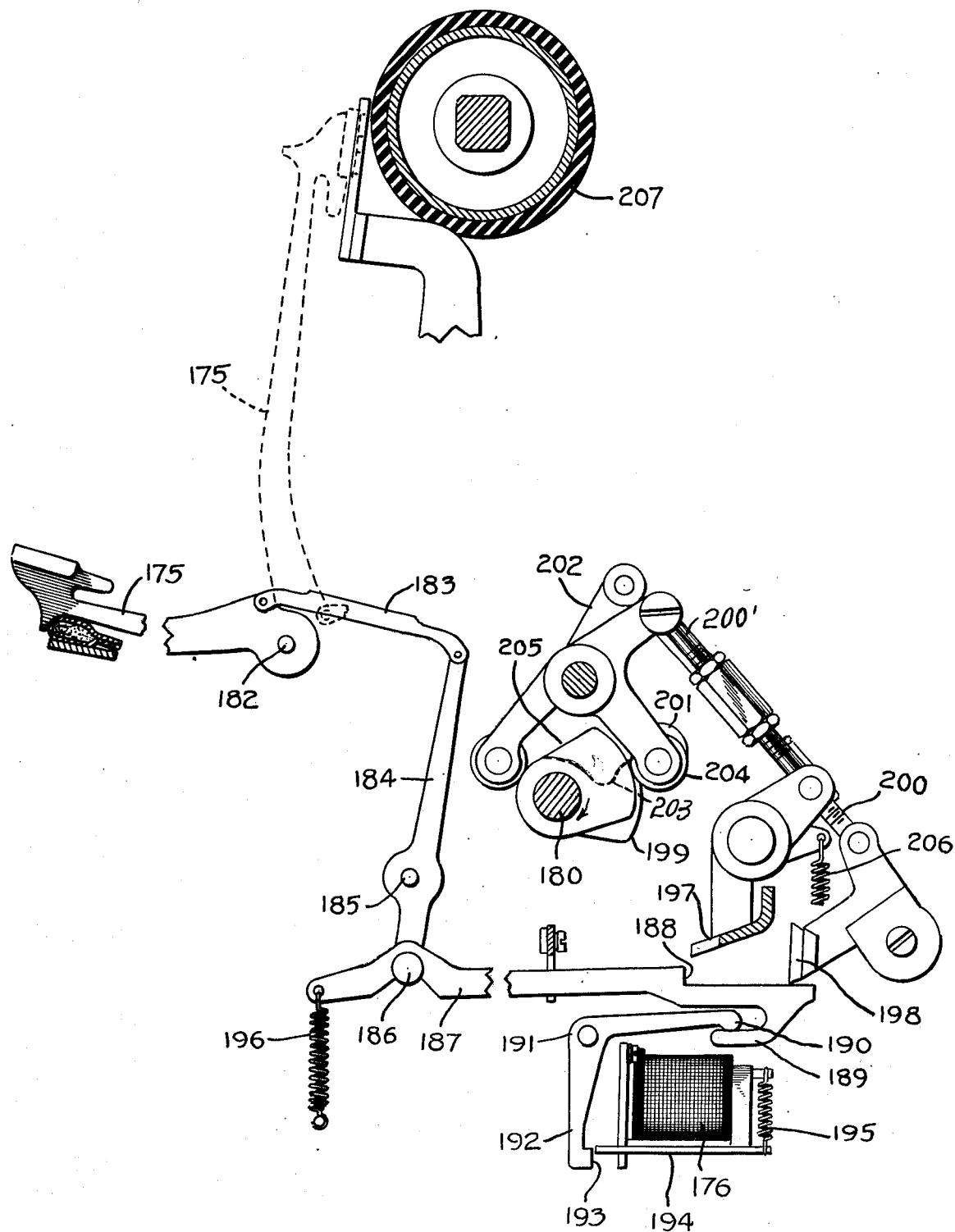
Figure 16:
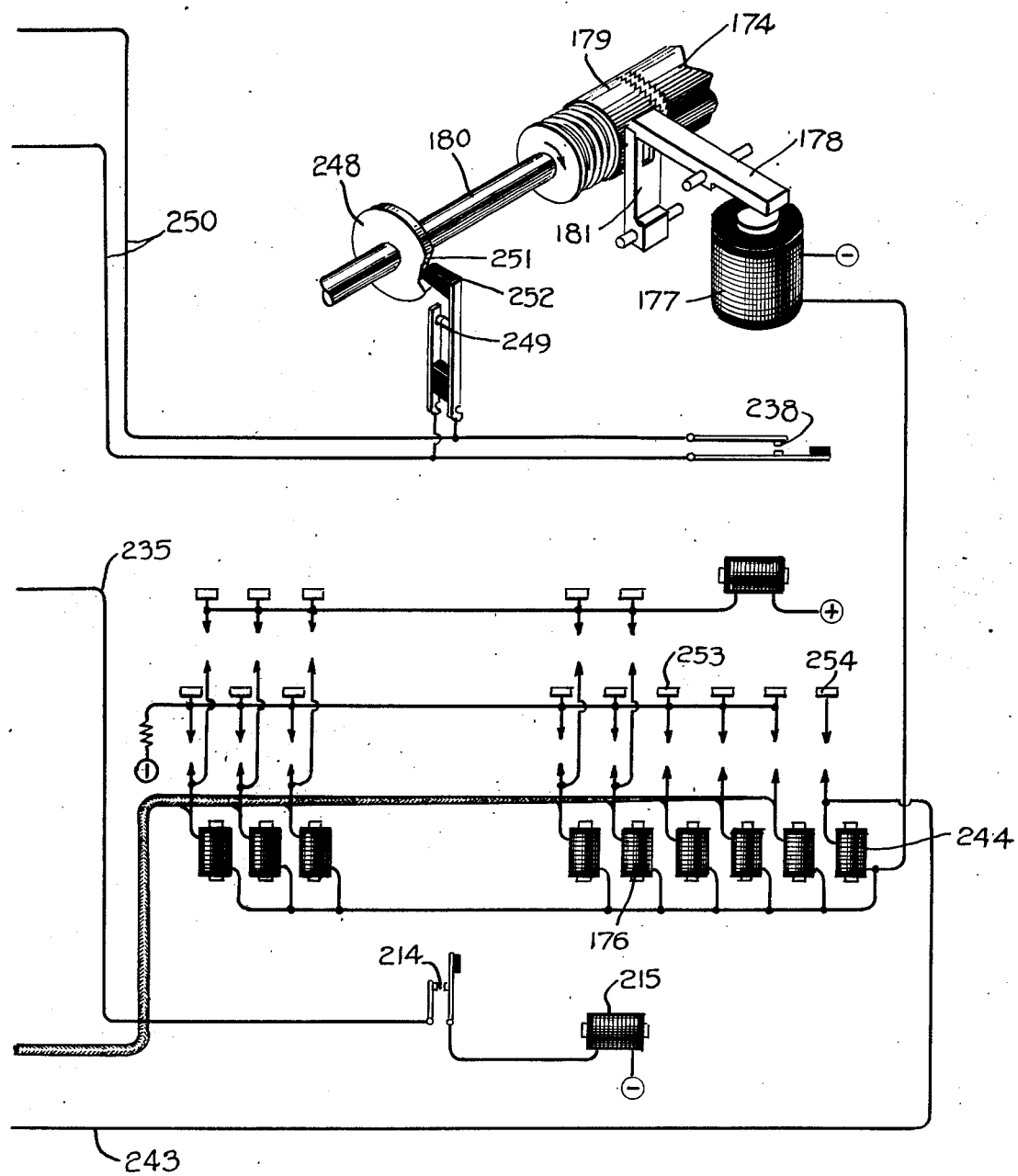
Figure 17:
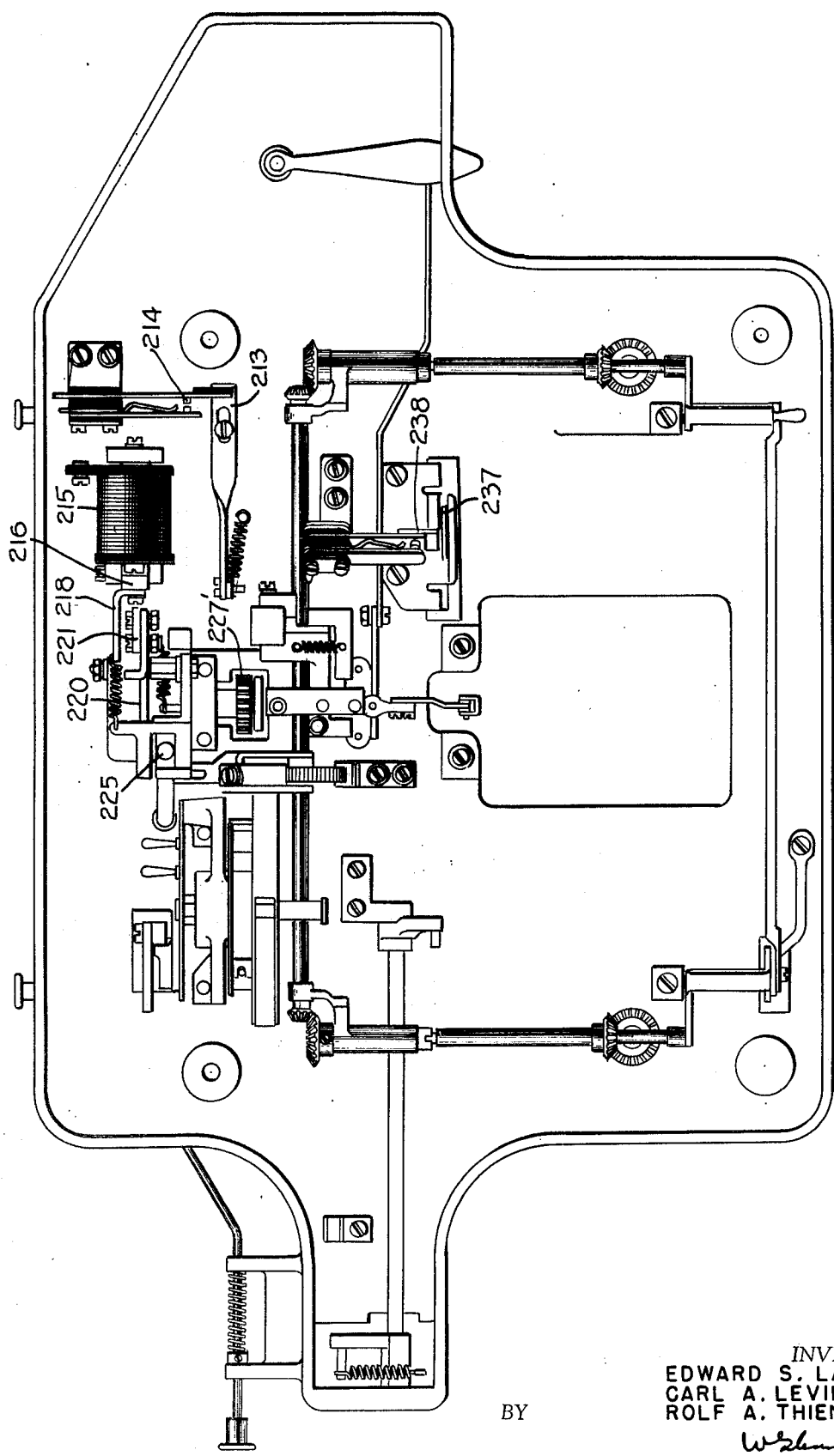

FIG. 13 is a perspective front view of the printing unit, with certain parts broken away;

FIG. 14 is a detail view of some of the keys of the printing unit;

FIG. 15 is a detail view of a type bar and the immediately associated operating elements;

FIG. 16 is a schematic diagram of some electrical connections in the printing unit that directly cooperate with those in FIG. 4;

FIG. 17 is a plan view of the parts carried by the upper plate member of the printing unit;

FIG. 18 is a rear elevation of the upper portion of the printing unit; and

FIG. 19 is a detail view of the added space lever.

FIG. 20 depicts means to release the carriage for return after a predetermined number of characters have been written in a line.

Hereinafter the unit for enciphering and deciphering, as distinguished from the printing unit, will be termed the ciphering unit for brevity.

We are aware that heretofore machines of this general type have been proposed and constructed, but they have certain defects that render them not perfectly accurate and dependable under all conditions. The present invention contemplates and provides safeguards whereby the defects in the previous mechanism are overcome.

Figure 1:
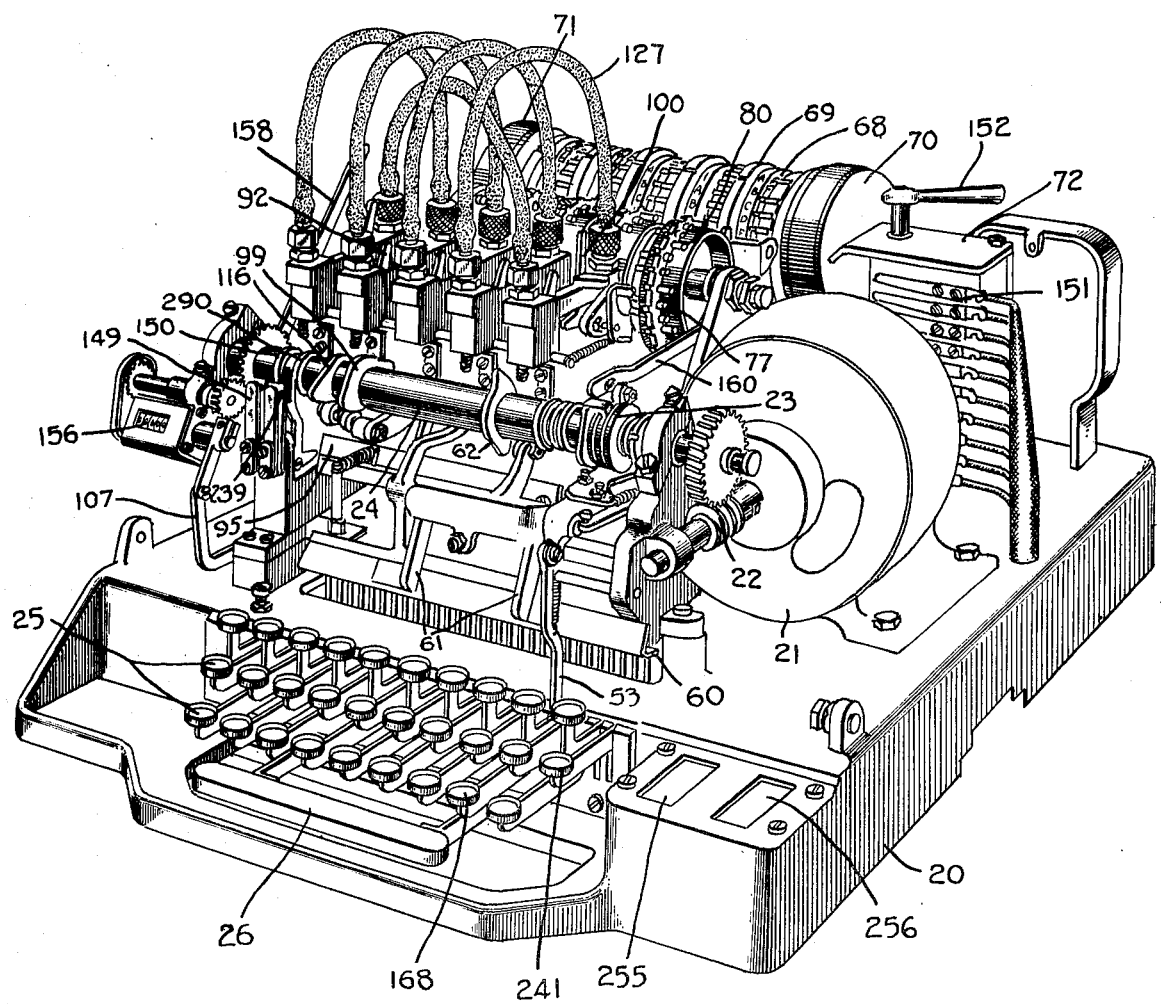
FIG. 1 is a perspective view of the ciphering and deciphering unit.

The ciphering unit, shown in perspective in FIG. 1, comprises a base 20 whereon is mounted motor 21 that supplies the power for the mechanical operations through a worm gear and pinion connection 22 to a clutch mechanism 23 that drives a cam sleeve 24. The construction of this clutch and the associated cam sleeve mechanism is fully shown and described in the U.S. Pat. to A. H. Reiber, No. 2,019,505, issued Nov. 5, 1935, and shown on a larger scale in FIG. 3 of the present drawings. The operation of the mechanism is controlled by the character keys 25 whereof there is one for each letter of the alphabet, by the space bar 26 and certain other keys that will be hereinafter fully described.

Figure 3:
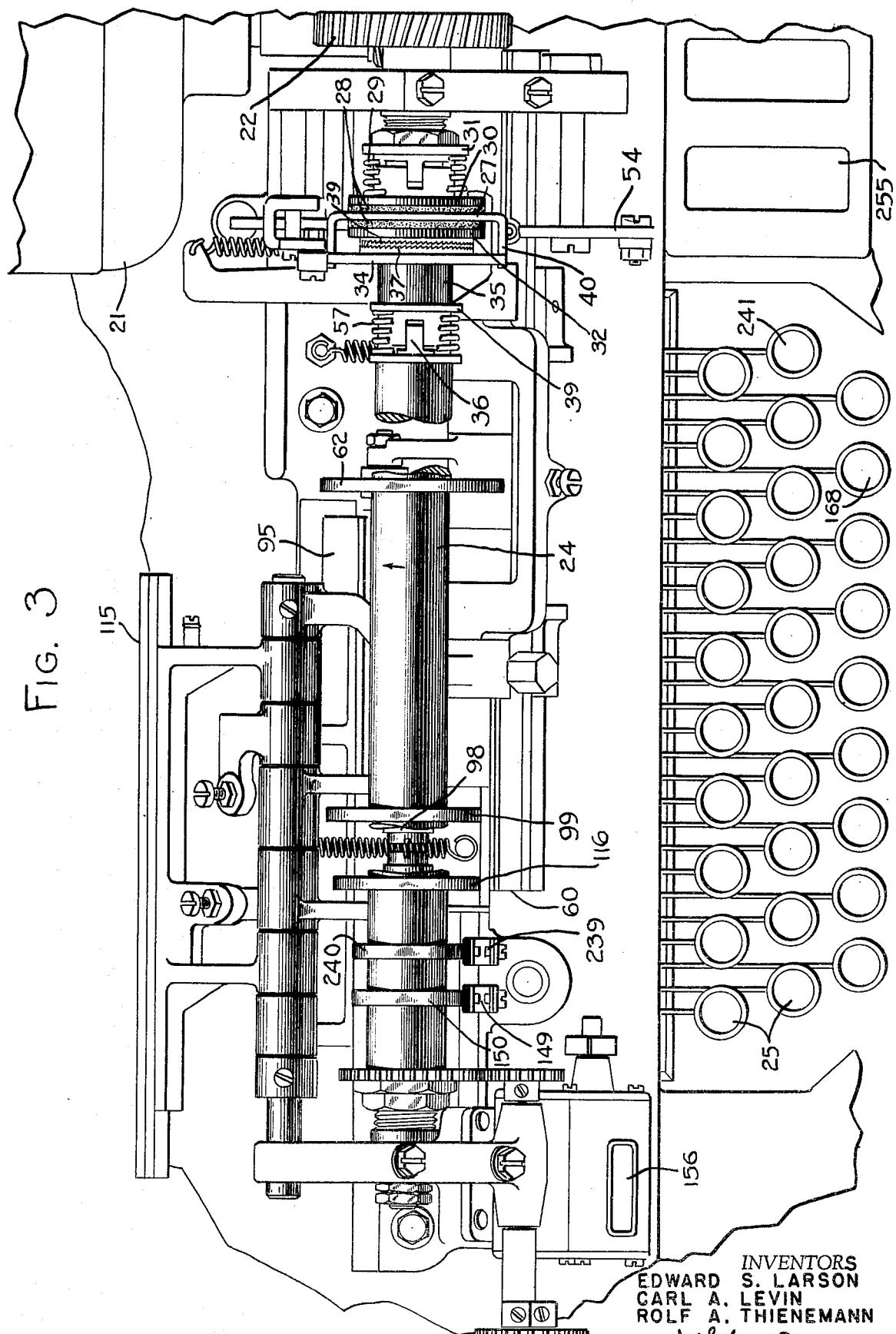
FIG. 3 is a top plan view of the cam shaft whereby the mechanism of FIG. 1 is driven.

As shown in FIG. 3, the clutch 23 comprises a disk 27 with a leather washer 28 on each side thereof and held in frictional engagement therewith by a spring 29 that is under compression between the members 30 and 31. Flange 32 is fixed to a sleeve driven by worm gearing 22 and is provided with teeth 33 forming the driving part of a positive mechanical clutch. Disk 34 is fixed to a stub sleeve 35 that engages cam sleeve 24 by the tongue slot connection 36, the stub sleeve 35 being movable longitudinally with respect to cam sleeve 24 to permit engaging and disengaging the teeth 37 carried by disk 34 with the teeth 33, the disengagement of the teeth 37 from teeth 33 being effected each 180 degrees of rotation of the clutch by a roller 38 (FIG. 10) mounted on a stud and disposed to engage camming surfaces on the disc 34. The disk 27 is provided with laterally turned arms 40 that are slidable in slots formed in cam portions 41 on the disk 34 (FIG. 10).

Clutch stop lever 42, pivoted at 43, carries a roller 44 to ride up on cam portion 41 and thus rock the locking projection 45 into position to engage one of the laterally turned portions 40 after 180° of rotation. The lever 42 is retained in the position just mentioned by a latch 46 that engages a lug 47 on the lower end of lever 42, the latch 46 being urged to locking position by a spring 48. Passing under the key levers 49 of all of the keys 25 and space bar 26 is a transverse bail 50 having at each end a pivotally mounted arm 51. Connected to the bail 50, by links 52 and 53, is a pivoted rocker lever 54 having one end disposed to contact the adjusting screw 55 secured in latch 46 whereby when any key 25 is depressed the bail 50 will be moved downwardly causing lever 54 to release latch 46 and permit spring 56 to withdraw the clutch stop lever from engagement with a member 40 and thus free the clutch for operation.

It is to be understood that the member 32 is continuously rotating during the use of the machine but slips on the leather washers 28 while the clutch is locked. However, there is sufficient friction between the washers 28 and the disk 27 to rotate the cam sleeve alone, when the latch is tripped, sufficiently to move the sleeve out of camming engagement with the roller 38 which permits spring 57 to move teeth 37 into engagement with teeth 33 and thus provide positive mechanical drive for the cam sleeve 24 to operate the mechanisms actuated thereby.

Still referring to FIG. 10, it will be observed that each key lever 49 has formed on it a hook 49' engaged over a pivoted contact operating lever 349 that has fixed to it an upwardly extending projection 58 having a forwardly turned pointed tip 59 and adjacent all the tips 59, which are in alignment with each other, is a locking blade 60 carried by spaced arms 61 pivoted at their upper ends and held away from tips 59 by a cam 62 on cam sleeve 24 while the clutch is locked. When a key 25 is depressed, the locking projection 58 on the associated lever 349 moves downwardly with the key lever 49 and, since the clutch is released and cam sleeve 24 is rotated when a key is depressed, the cam 62 is moved so it no longer holds blade 60 away from tips 59 and spring 63 rocks blade 60 so that it lies above the tip 59 of the key that is depressed and beneath the tips of all other keys, thus locking the one contact operating lever 349 in its depressed position and locking all the other keys against operation until the completion of the cycle of operation initiated by depressing the key, the key 25 being returned to normal position by spring 64. When the blade 60 is again moved away from tips 59 by cam 62, the lever 349 is restored to its normal position by a spring 349'. The bail 50 is returned to position by spring 65 acting upon link 53.

Figure 2:
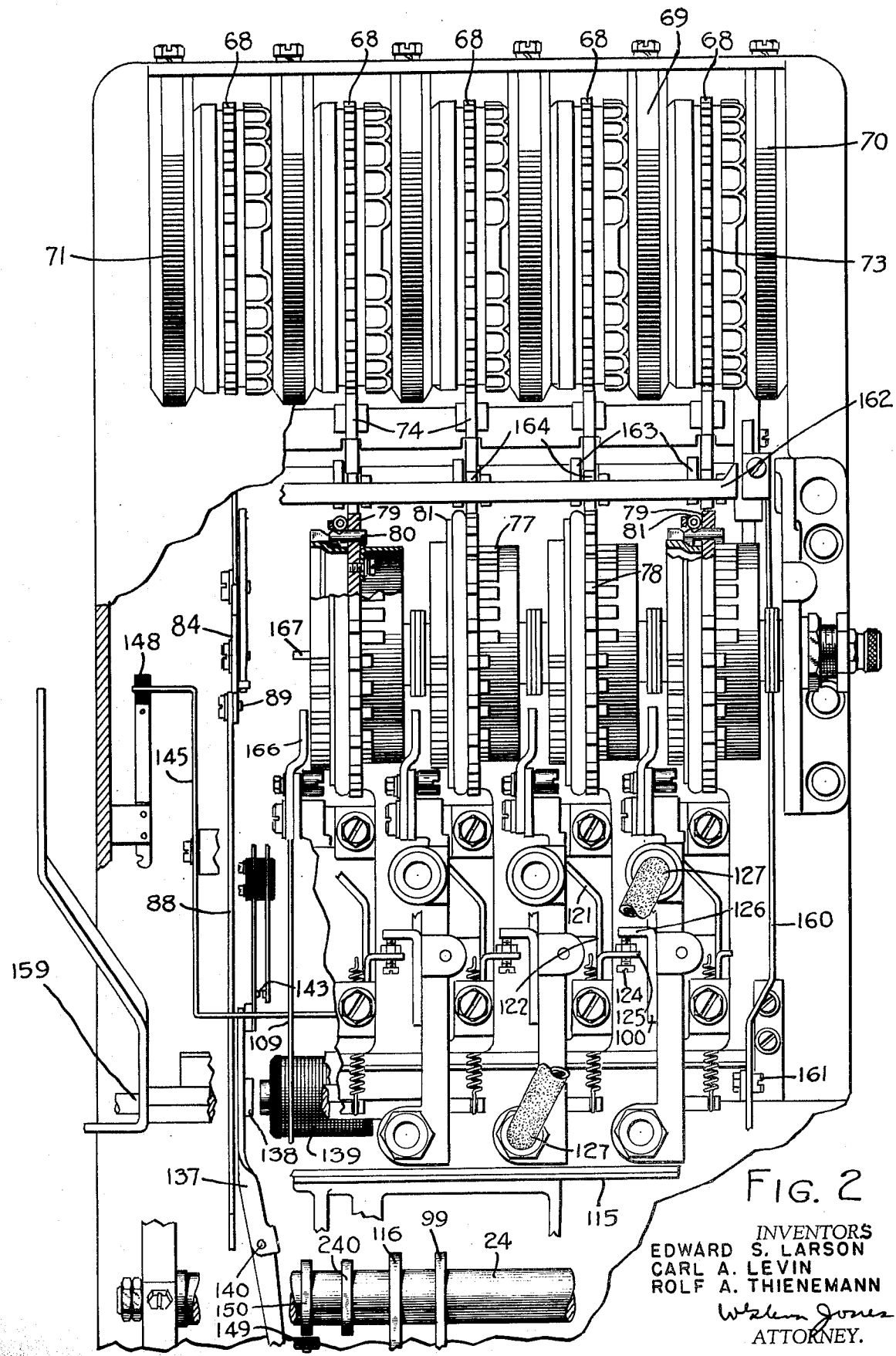
FIG. 2 is a top plan view of the circuit maze drums of FIG. 1 and immediately associated operating mechanism therefor.

Each lever 349 has a downwardly extending finger 66 disposed to close a pair of contacts 67 individual to the key 25 and included in an electrical circuit established as will now be set forth. The ciphering unit includes a plurality of drums 68 (FIGS. 2 and 5) coaxially mounted on a common shaft for individual rotation, in the present instance five of such drums being shown although any desired number thereof may be used. Each drum is provided on each face with a number of contact members 68' equal to the number of characters to be used in coded messages. The contacts on the opposite faces of the drum are randomly connected in pairs by wires as indicated in FIG. 4, but inasmuch as the construction of these drums is well known, no detailed illustration or description thereof is given herein. Between each two of the drums 68 is a fixed member 69 having pairs of contacts corresponding in their radial positions and angular spacing with the contacts 68' on the drums 68 whereby each member 69 serves to connect the contacts in the two drums 68 adjacent thereto and establish continuous circuits through all of the members 68 and 69. Right-hand end member 70 and left-hand end member 71 likewise have contacts to coact in establishing the said circuits, the contacts in the end members being connectible through a multiple switch 72 with either the contacts 67 closed by the respective keys 25 or to the respective key bar selector magnets in the printing unit, as will be hereinafter fully set forth. Each drum 68 has an annular series of teeth 73 corresponding in number and spacing to the contacts on the faces of the drum and a detent roller 74 (FIG. 5) mounted on an arm 75 is disposed to drop into the space between each two of the teeth 73 to insure that the drum 68 will stop in such position that the contacts carried thereby will be aligned and electrically continuous with the contacts in the members 69 on each side thereof or in an end member 70 or 71, as the case may be, a spring 76 connected to arm 75 permitting the roller 74 to ride up over the teeth 73 when the drum is rotated.

Associated with each of the drums 68 and mounted in fore and aft alignment therewith is a rotatable wheel 77, each of which has an annular series of teeth 78 that is preferably different in number of teeth on a drum 68. Each wheel 77 has a circumferential rib 79 through which are passed pins 80 that are slidable through the rib 79 to cause them to project on one side or the other of the rib 79, the pins being held in the position to which adjusted by an annular coiled spring 81 that seats in notches in the pins 80 in each of the two positions of adjustment of the pins.

Pawl lever 82 is pivoted at 83 and carries at its other end a pivoted pawl 84 disposed to engage the teeth 78 on the wheel 77, the spring 85 holding the pawl 84 in yielding contact with the wheel. A similar pawl 86 engages the teeth 73 of the drum 68 and is mounted on a pawl lever 82' (FIG. 11) identical with pawl lever 82, the pawl levers of each coacting drum 68 and wheel 77 being pivotally connected to a common push bar 87. The forward portion 88 of each push bar is pivotally connected for vertical swinging movement at 89 and has a forwardly facing shoulder 90 and a rearwardly extending finger 91.

Conditioning lever 92 is pivoted at 93 and the lower portion thereof carries a stud 94 disposed to be movable into contact with finger 91 to lift the forward portion 88 of the push bar when conditioning lever 92 is rotated in a counter-clockwise direction on its pivot, and to permit the said forward portion 88 to drop when the conditioning lever is rotated clockwise. Lifting the forward portion 88 by counter-clockwise rotation of the conditioning lever 92 moves the shoulder 90 into the path of push bar bail 95 which imparts a rearward movement to the push bar 87 and, through pawls 84 and 86, rotates drum 68 and its coacting wheel 77 through an angular distance corresponding to the tooth spacing on each. Bail 95 is fixed to an arm 96 integral with a second arm 97 carrying roller 98 that follows cam 99 on cam sleeve 24, cam 99 in common with all the other cams on sleeve 24 being double to effect a cycle of operation by 180° rotation of sleeve 24, as above described.

Latch 100 is pivoted at 101 and has a forwardly extending arm 102 disposed to be engageable with a shoulder 103 on conditioning lever 92 and a rearwardly extending arm 104. Spring 105 is provided to rotate latch 100 to move arm 102 into latching engagement with shoulder 103. Roller arm 106 is pivoted at one end at 107 and carries a roller 108 disposed in the path of pins 80 carried by wheel 77, the lever 109 being pivoted to the free end of arm 106 and normally held retracted by spring 110 to maintain the roller 108 in contact with pins 80 but yieldable to permit roller 108 to ride up over the pins.

As roller 108 rides over a pin 80, the lever 109 is moved forwardly and projection 111 engages stud 112 on conditioning lever 92 which rotates lever 92 clockwise and permits spring 105 to move arm 102 into latching engagement with shoulder 103, thus allowing forward portion 88 of push bar 87 to be pulled down by spring 113 out of the path of bail 95 and preventing the rotation of drum 68 and wheel 77. Some of the pins 80 in each wheel 77 are adjusted to contact the cooperating roller 108 and some are adjusted so they do not contact the roller 108 and thus the actuation of lever 109 is made sporadic, it being understood that the pins 80 in the various wheels 77 are set to actuate the cooperating levers at different times.

The forward ends of levers 109 are slidably supported and guided by being passed through slots in straps 114 and when moved forwardly by contact of the associated roller 108 with a pin 80, the said forward ends are moved into the path of bail 115 that is rotated upwardly by cam 116 on cam sleeve 24. Inasmuch as the bail 115 moves in an arcuate path and the lever 109 is not held forwardly by a pin 80 for a sufficient length of time to complete the operation, a lug 117 is provided on each lever 109 to engage the bail 115 and prevent retraction of the lever 109 by spring 110 until bail 115 is no longer acted upon by cam 116 and is moved downwardly by spring 118.

Pivoted on each conditioning lever 92 is a transfer slide 119 that has its rear free end 120 disposed to contact arm 104 of latch 100 when the latch is engaged with conditioning lever 92 and to contact portion 121 of transfer lever 122 (FIG. 12) when arm 102 is disengaged from conditioning lever 92. When latch 100 is disengaged and end 120 of slide 119 is moved down against portion 121, transfer lever 122 is rocked on its pivot 123 and adjustable screw 124 carried by portion 125 of the transfer lever contacts the laterally turned portion 126 of the latch 100 in the next adjacent mechanism and disengages the latch of the said adjacent mechanism, which permits the conditioning lever 92 of that next adjacent mechanism to be rotated counter-clockwise and thereby move the push bar of the said next adjacent mechanism into position to be actuated by push bar bail 95. Transfer slide 119 passes through a slot in laterally turned portion 126.

If the conditioning lever 92 upon which a transfer slide 119 is mounted is latched at the time the rear end 120 of the slide is moved downwardly, then the said rear end contacts arm 104 of the latch in the same mechanism, disengaging it from the conditioning lever 92 and permitting that lever 92 to rotate counter-clockwise and lift the forward end 88 of the push bar into the path of the push bar bail 95.

Transfer slide 119 is operated by a wire 127 having at one end a plunger 128 disposed to be pushed upwardly by a lever 109 when the lever is raised by bail 115 and having plunger 129 at its other end positioned to push down upon the rear end 120 of transfer slide 119. As is illustrated in FIG. 1, the ends of the wires are so cross-connected that when the lever in one drum operating mechanism is actuated, the conditioning lever 92 in some other drum operating mechanism is unlatched and, by the action of the transfer lever 122 and the transfer slide 119, at least two of the drums will be rotated each cycle of operation, provided two of the conditioning levers 92 are unlatched when the operation of the machine is begun. This eliminates one defect heretofore encountered in devices of this type, where it was found that a condition was reached in which no drum would be rotated when a key was depressed and consequently the same random circuit condition persisted for successive characters.

It is apparent that some means must be provided for transferring motion from the drum operating mechanism on the right-hand side of the machine, as seen by the operator, to that on the left-hand side thereof. This is accomplished by the mechanism shown in FIGS. 12 and 5 wherein the transfer lever 122 has a tab 130 struck out from the portion 121 to engage a crank 131 fixed to transfer cross rod 132, which extends across the machine to the right-hand side of the mechanism where there is fixed to it a crank 133 engaged with the rear arm 104 of the latch 100. It is evident that when the transfer lever 122 in FIG. 12 is rocked in a clockwise direction, the shaft 132 will be rotated counter-clockwise which will in turn rotate the right-hand latch 100 counter-clockwise and thereby unlatch the right-hand conditioning lever 92. The right-hand latch 100 is identical with all the others except for the hole wherein the crank 133 is engaged and the left-hand transfer lever is identical with the others except it is not provided with the contact screw 124 and has the portion 130 formed on it.

In FIGS. 4 and 10, there is shown a member 135 mounted to be slidable longitudinally of itself, lying under the arms 51 of the bail 50, in which member are formed cutout portions 136 normally lying under the arms 51 to permit free operation of the bail 50. Under certain conditions, hereinafter explained, it is desirable to lock the bail 50 against rotation thereby to prevent operation of the keys and when the member 135 is moved longitudinally so that the cutout portions 136 are not disposed beneath the arms 51, rotation of bail 50 is prevented.

Figure 5:
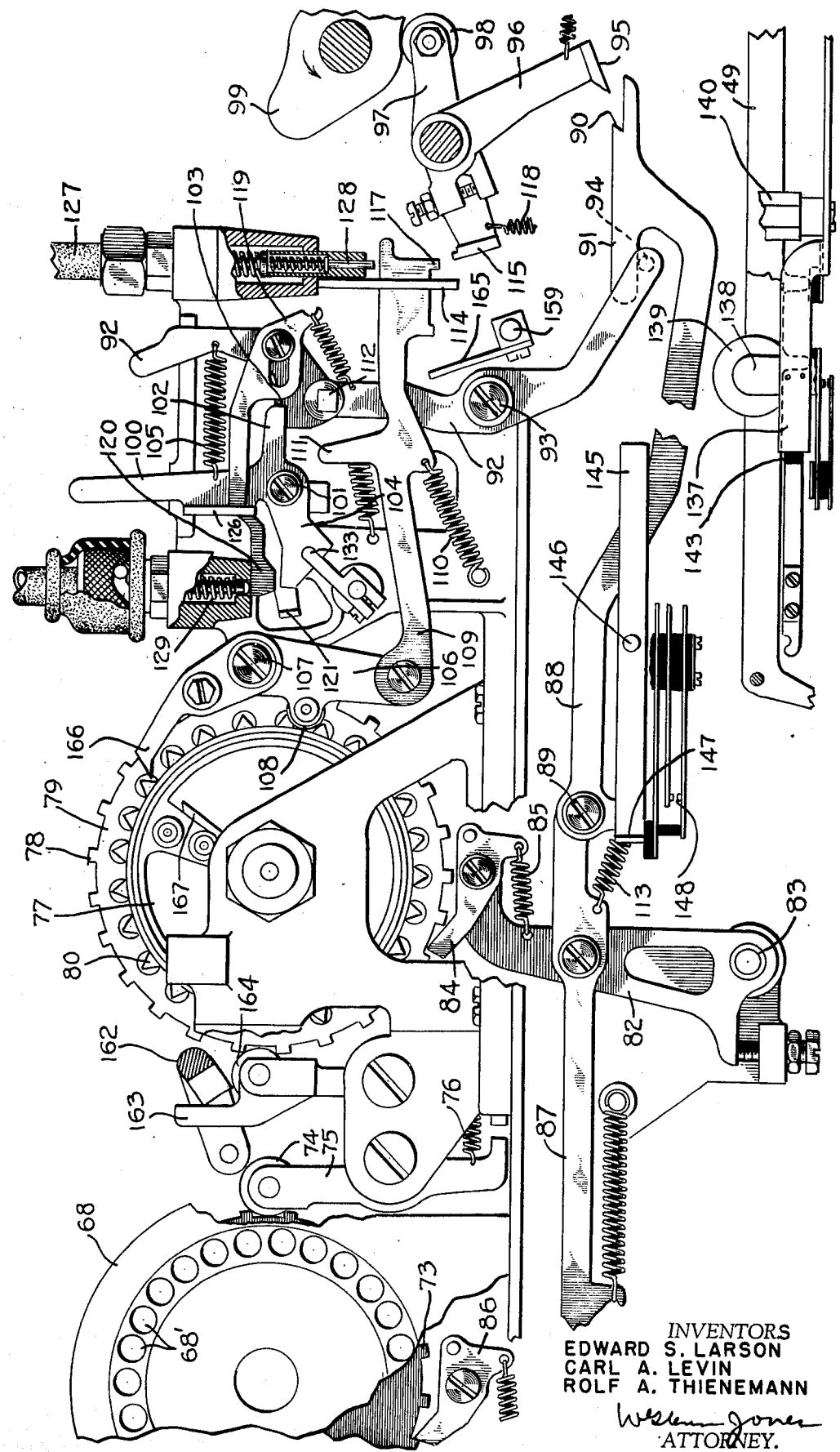
FIG. 5 is a detail side elevation of the mechanism for controlling the operation of the elements depicted in FIG. 2.

The mechanism for so moving the locking member 135 is shown in FIGS. 4 and 5 as a lever 137 fixed at one end to armature 138 of an electromagnet 139 and pivoted on a shaft 140, the other end of lever 137 being connected to the locking member 135 by a spring 142 of sufficient stiffness to slide the member 135 normally, but it will yield to prevent damage to the parts in the event the electromagnet 139 should become energized while the bail 50 is depressed. A pin 141 secured in lever 137 contacts locking member 135 but is not engaged therewith, to push member 135 back to unlocked position when magnet 139 is deenergized and spring 144 again becomes effective. Lever 137 has one end disposed to close a pair of contacts 143 to close a circuit that keeps the magnet 139 energized when certain contacts in the printing unit, hereinafter to be described, are closed. It is to be understood that the showing in FIG. 4 is schematic and that the lever 137 is there shown straight and not offset as it actually is. After magnet 139 is deenergized, spring 144 returns locking member 135 to the position thereof that permits operation of bail 50.

Overlying all the push bars 88 is a bail 145 pivoted at 146 and having an arm 147 disposed to hold contacts 148 open so long as any push bar 88 is raised into position to be engaged by bail 95 but if no push bar is raised and conditioned for operation the bail 145 drops down, which permits contacts 148 to close, thus completing the circuit through magnet 139 and locking the keyboard. If, now, one or more latches 100 are manually moved to disengage each from the associated conditioning lever 92, resulting in the raising of one or more push bar portions 88 into operating condition, bail 145 will be rotated to open the contacts 148 and deenergize magnet 139.

Normally open contacts 149 are in series with all of the key operating contacts 67 and are closed by a cam 150 on cam sleeve 24 after the rotation of drums 68 has ceased and serve to complete the circuit from the source of energy supply to the drums to permit flow of current only after the drums cease moving and the circuits through drums 68 are completely established.

The details of switch 72 are shown in FIGS. 6, 7, and 8. This switch includes as many contact pile-ups 151 (FIG. 8) as there are character keys 25. When handle 152 is in one position, the pile-up contacts are closed to send the current through the random circuits of drums 68 from left to right, which is the switch position for enciphering a message, and when the handle 152 is moved to its other position the pile-up contacts are shifted to send the current through from right to left, which is the deciphering position.

A snap switch 153 is operated by handle 152 to connect motor 21 to the source of current. Arm 154 is connected to handle 152 to close contacts 155 that complete a circuit through keyboard lock magnet 139 to lock the keyboard when switch 153 is not moved fully to the enciphering or the deciphering position but to permit contacts 155 to open when the switch is properly set for either enciphering or deciphering.

Counter 156 is geared to cam sleeve 24 to register the number of characters printed. The counter is connected by link 157 to reset lever 158 to change the reading of the counter back to zero when the reset lever is operated. Reset lever 158 is keyed on a shaft 159 to which is connected a link 160 by an arm 161, the link 160 being connected by means of a crank to eccentrically mounted detent release shaft 162 to rotate shaft 162 against fingers 163 to disengage detent rollers 164 from engagement with the teeth 78 of wheels 77 to permit free rotation of the wheels to set them to an initial position.

Fixed to rotate with shaft 159 is a reset bail 165 that is moved to engage levers 109 and slide these levers forwardly until the projections 111 contact studs 112 and latch all of the conditioning levers 92. This movement of the levers rotates detents 166 which are secured to roller arms 106 into the paths of stops 167 fixed on wheels 77 and the wheels 77 are then rotated manually until each stop is against its coacting detent 166 and all the wheels 77 are in their initial positions. Before beginning operation of the machine, a number of the conditioning levers 92, preferably two, are tripped to condition the respective mechanisms for operation.

To permit operating the coding unit without the printing unit, a repeat key 168 (FIG. 3) is provided and has a projection 169 (FIG. 10) secured to the key lever to engage a rocking lever 170 that lifts the spring held plunger 171 to raise the non-repeat latch 172 out of engagement with the clutch stop lever 42 and permit the clutch to rotate cam sleeve 24 as long as the repeat key is held down.

The printing unit utilized with the above described coding unit is in general similar to the Typebar Page Printer, Model 12, described in Bulletin No. 109, April 1926, of the Teletype Corporation, but it is modified in certain respects, that will be set forth in detail, to adapt it for service with the coding unit.

The motor 173 (FIG. 13) is connected to the clutch driving member 174 (FIG. 16) which supplies the power for actuating the various mechanical units of the printer, shown in perspective in FIG. 13. Each of the type bars 175 is controlled by an individual selector magnet 176 that is connected at one side to one of the circuits through the drums 68 of the coding unit and is connected in common with all the selector magnets to a clutch release magnet 177 disposed to rock the pivoted lever 178 and release clutch driven member 179 to engage clutch driving member 174. Thus, each time a pulse is received by any selector magnet 176, cam shaft 180 is driven through a complete revolution, but is stopped by clutch throw-out lever 181 upon completion of the revolution.

As shown in FIG. 15, each type bar 175 is pivotally mounted at 182 and is connected by a link 183 to a lever 184 pivoted at 185, having at its lower end a stud 186 seated in a bight in push bar 187. On the upper side of push bar 187 is a shoulder 188 and on the other side thereof is a finger 189 forming a bight in which is disposed the end of one arm 190 of a bell crank lever 191, the other arm 192 of which has formed on it a projection 193 that is opposable to armature 194 that is constrained by spring 195 to lie normally opposite the projection 193 to prevent rotation of lever 191 by action of spring 196 on push bar 187. However, when selector magnet 176 is energized, the armature 194 is attracted toward the magnet and is so raised that projection 193 can swing under armature 194 and the spring 196 raises push bar 187 to bring shoulder 188 into the path of bail 197.

As seen in FIG. 15, the push bar 187 is held down by depressing bail 198 operated by cam 199 on cam shaft 180, through link 200. The function of bail 198 is to move all of the push bars 187 out of the path of bail 197 so that only the push bar selected by a pulse from the coding unit will be in position for operation by bail 197. When shaft 180 begins to rotate, roller 201 carried by arm 202 connected to link 200 follows down a depression 203 in cam 199 and moves bail 198 away from the push bars permitting the selected push bar to rise. Immediately thereafter, roller 204, which is connected to bail 197 by link 200', rides off cam 205 and spring 206 swings bail 197 into engagement with shoulder 188 to apply a thrust to the selected push bar 187 and thereby operate the connected type bar 175. Since bail 197 swings in an arc, it is disengaged from shoulder 188 before the type bar 175 reaches platen 207 and the final portion of the printing stroke is accomplished by the momentum of the type bar. This prevents driving the type bar against the platen with too great force.

It is desirable that the characters in a coded message be separated into groups in each line and for this purpose we have provided extra space mechanism associated with the spacing rack 208 (FIG. 19). As is well understood in this art, each tooth 209 on rack 208 shifts the carriage one space each time a letter is printed. On the upper side of a member 208' paralleling rack 208 and opposite the fourth tooth 209 and each fifth tooth 209 thereafter is a projection 210 that raises roller 211 and rocks pivoted lever 212 to move link 213 to close contacts 214 that energize added space magnet 215 (FIG. 18). Armature 216, which is pivoted at its upper end, carries a latch 217 and a projection 218 having at its outer end a shoulder 219. Lever 220 is pivoted intermediate its ends and has a latching shoulder 221 engageable with latch 217, to which position it is urged by spring 222. Lever 220 has also an arm 223 disposed in the path of a stud 224 fixed to plunger 225 and pawl 226 that engages the teeth of a ratchet wheel 227 that drives a pinion 227' (FIG. 17) meshed with the teeth 209 of rack 208. Contact stud 228 is fixed in an arm 229 that is loosely mounted on shaft 230 and is actuated by a cam on shaft 180 to move plunger 225 and pawl 226 upwardly once each revolution of shaft 180. With the parts in the position shown in FIG. 18, arm 223 allows stud 224 to drop down sufficiently so that when moved upwardly by contact stud 228 ratchet wheel 227 will be rotated one tooth.

When, however, magnet 215 is energized, armature 216 is attracted, which releases latching member 221 from engagement with latch 217 permitting spring 231 to rotate arm 223 down so that pawl 226 moves down to engage the second tooth instead of the next tooth. In addition, when armature 216 is attracted by magnet 215, spring 232 acts upon one arm of bell crank lever 233 to move the other arm thereof into latching engagement with shoulder 219 to insure that the armature will be held in its attracted position sufficiently long for spring 231 to move stud 224 down and rock lever 220 out of position where the part 221 could become latched with 217 before completion of the desired operation. However, when stud 224, urged by spring 231, rocks arm 223 downwardly to a predetermined position, screw 234 carried by arm 223 contacts the arm of bell crank lever 223 and rotates the bell crank lever to disengage it from shoulder 219, thus permitting the armature 216 to move away from magnet 215, whereupon, when plunger 225 is moved upwardly, the ratchet wheel 227 is rotated two teeth and an extra space is inserted in the line being printed by the type bars. This same upward movement of stud 224 permits spring 222 to rotate lever 220 in a clockwise direction and effect latching engagement of 221 with 217 so that the next operation of the spacing mechanism will result in rotating ratchet 227 but one tooth.

Considering now FIGS. 4 and 16 together, it will be seen that conductor 235 connects contacts 149 in the coding unit in series with added space contacts 214 in the printing unit so that the added space magnet 215 will not be energized until the contacts 149, as well as 214, are closed. Therefore, the projections 210 are placed above the fourth, ninth, fourteenth, etc. tooth of rack 208 and, consequently, contacts 214 are closed the first time in each line when the fourth character is printed and thereafter, when sleeve 24 rotates in response to the actuation of the fifth key 25, the contacts 149 will be closed and added space magnet 215 will be energized to insert an extra space in the line, as above described.

After a predetermined number of characters have been printed in a line, it is desirable that a new line be started but operation of keys 25 should be prevented after one line is completed and until the mechanism is changed to write another line. The parts shown in FIG. 20 are provided for this purpose, the adjustable cam 236 on a member of the printer carriage being brought into contact with lever 237 to close contacts 238 and so energize the locking magnet 139. Again referring to both FIGS. 4 and 16, it will be seen that contacts 238 cannot by themselves close the circuit through magnet 139 but that the contacts 239 operated by cam 240 on cam sleeve 24 must be closed simultaneously. Consequently, in the present device wherewith it is preferred to print 50 characters in each line, the contacts 238 are closed at the time of the printing of the forty-ninth character and when the sleeve 24 is then rotated to record the fiftieth character, cam 240 closes contacts 239 and completes the circuit to locking magnet 139.

When the keyboard is locked at the end of a line, as above described, the operator depresses the carriage return key 241 (FIG. 4) which closes contacts 242 that are connected by conductor 243 to carriage return selector magnet 244 (FIG. 16) and energizes both the selector magnet 244 and clutch release magnet 177. The magnet 244 selects a push bar similar to 187, which is permitted to rise into the path of bail 197 and operates a plunger (not shown) to rock bell crank lever 245 (FIG. 18) and move link 246 that rotates a pawl disengaging cam 247 to release the detents from ratchet wheel 226 and permit the usual draw strap to return the carriage to the start of another line. By means of mechanism described in the aforementioned Bulletin No. 109, the platen is simultaneously rotated to provide line spacing, but inasmuch as neither the carriage return mechanism nor the line spacing mechanism constitutes any part of this invention, they will not be further described. It is apparent that returning the carriage to the start of another line will permit contacts 238 to open and thereby break the circuit through locking magnet 139 so far as contacts 238 are concerned.

Shaft 180 of the printing unit carries a cam 248 disposed to operate contacts 249 that also close the circuit through the locking magnet 139 through leads 250 to which the contacts 249 are connected in parallel with contacts 238. Cam 248 has in it a depression 251 into which the contact operating lug 252 drops when the shaft 180 is rocked, but upon rotation of this shaft, the lug 252 rides up on the cam and opens the contacts 249. Therefore, if a key 25 of the coding unit is depressed and sleeve 24 is rotated, the cam 240 will close contacts 239 and if the printer fails to function and shaft 180 does not rotate in response to the operation of the key 25, a circuit through locking magnet 139 will be closed through contacts 249 and the keyboard will be locked, thereby apprising the operator that the printer is not working. Inspection of FIGS. 4 and 16 together discloses the fact that when the locking magnet 139 is energized, while either of contacts 249 or 238 are closed, a holding circuit will be completed through contacts 143 that will keep the keyboard locked. However, when the carriage return key 241 is depressed, the carriage is returned, which breaks the circuit through contacts 238 and also energizes clutch release magnet 177 so that shaft 180 rotates and breaks the circuit through contacts 249, thus interrupting the holding circuit through contacts 143 and releasing the keyboard lock.

The printing unit is provided with keys 253 that energize the selector magnets 176 to operate type bars 175 for printing headings or such other data as it may be desired to type directly on the message sheet. It will be noted in FIG. 16 that the circuits closed by keys 253 include the clutch release magnet 177. The printing unit includes a carriage return key 254 connected to energize the carriage return selector magnet 244.

Operation

The mode of operation of the above described mechanism will now be set forth. The drums 68 are set to their initial positions, which may be determined by bringing a line on each drum into alignment with similar lines on all the other drums. The pins 80 in wheels 77 are set so that the levers 109 will be operated sporadically. For example, the pins 80 in one wheel 77 may be set so that, beginning at the initial position, two pins will be in the path of the cooperating roller 108, the next succeeding three pins will be out of the path of roller 108, then one pin will be in the path of the roller, etc. The arrangements of the pins in each wheel 77 will preferably be different from that in all other wheels.

Reset lever 158 is operated to set counter 156 to zero, to latch all the conditioning levers 92 and to release the detents 164 of all the wheels 77 and the wheels 77 are moved to bring their stops 167 against the respective detents 166. Reset lever 158 is moved back to inoperative position and certain of the conditioning levers 92 are then unlatched to bring the push bar members 88 controlled thereby into operating relation with push bar bail 95.

Switch 152 is then thrown to the enciphering position which connects all of the keyboard contacts 67 to the left-hand end member 71 of the coding machine so that the current passes through the random circuits in drums 68 and members 69 from left to right. In addition, switch 153 is thrown thereby to energize motors 21 and 173, to open keyboard locking contacts 155 and to send current to a small lamp under window 255 bearing the legend "encipher". Furthermore, in the enciphering position, switch 152 closes contacts that complete the circuit through added space contacts 214, which are open when the switch is in the deciphering position.

The keys 253 of the printing unit are then operated to type the heading on the message together with such other information as may be sent in plain language. Then the key 25 of the coding unit bearing the first character of the message to be coded is depressed, which operates bail 135 and thereby releases clutch 23 to effect driving engagement with sleeve 24 which then begins to rotate. Cam 62 moves bail 60 to hold depressed the key that was operated and lock all other keys against depression, the contacts 67 being closed by projection 66. The push bar members 88 individual to the drum operating mechanism in which the conditioning levers 92 were tripped are moved rearwardly by bail 95 driven by cam 99 and the wheels 77 and drums 78 in such mechanisms are rotated one step each. After the drums have ceased moving cam 150 closes contacts 149 to complete a circuit through drum 68 and member 69 to clutch release magnet 177 and to one of the selector magnets 176, freeing the push bar 187 controlled thereby to rise into the path of bail 197, the depressing bail 198 having been moved out of contact with the push bar 187 in the meantime. Bail 197 is then released from control of its cam 199 and is moved forward by spring 206 to actuate type bar 175 and cause the character thereon to be printed, the printed character being, except in very rare instances, different from that on the key 25 of the coding unit that was operated.

If a pin 80 in one of the wheels 77 that was rotated is set to contact a cooperating roller 108, the lever 109 connected thereto is moved forward, the projection 111 engaging stud 112 and latching the conditioning lever 92 and the bail 115 carries upwardly the lever 109 thus moved to apply a thrust to the wire 127 associated therewith, the Bowden wire then acting upon the transfer slide 119 associated with the other end thereof, tripping the latch 100 in the mechanism to which the said other end is connected, if that latch is engaged with its conditioning lever 92, or, through transfer lever 122, tripping the latch in the next adjacent mechanism if the cooperating conditioning lever 92 is unlatched.

It is thus apparent that at least two of the drum operating mechanisms will be conditioned for operation so that at least two of the drums 68 will be rotated one step each to change the random circuits each time a character is printed, but whether the same drums will be rotated in the next cycle of operation or other drums will be selected depends upon the setting of pins 80. It is clear from FIG. 5 that the ends of the Bowden wires 127 that contact the respective transfer slides 119 are readily disconnectible so that the arrangement of the said other ends may be varied at will.

After four characters have been printed, the lever 212 is actuated by a projection 210 on the member 208 of the printing mechanism to close contacts 214 of added space magnet 215, releasing arm 220 to be moved by stud 224 to permit pawl 226 to drop down a space of two teeth of ratchet 227. When stud 228 is moved upwardly after the printing of the next character, the ratchet 227 is rotated to move rack 208 the space of two teeth 209. It is to be understood that stud 228 is so adjusted that, at the uppermost part of its movement it is positioned to move pawl 226 the proper distance upwardly to effect the spacing, but the position of stud 228 when at its lowermost position is of no consequence. Since the pulse that energizes extra space magnet 215 is transmitted simultaneously with the pulse that energizes selector magnet 176, the magnet 215 is not effective until the closing of contacts 149 by cam 150.

As the forty-ninth character is printed, cam 236 operates lever 237 to close end of line contacts 238 and when cam sleeve 24 is operated for the fiftieth character, cam 240 closes contacts 239 which completes the circuit through keyboard locking magnet 139 and moves the member 135 to lock bail 50 against rotation, thereby preventing further operation of keys 25 until the keyboard is unlocked. The operator then depresses carriage return key 241, which is not locked by bail 50, and the ratchet 227 is released to permit the draw strap to return the carriage to the beginning of a new line and simultaneously the line spacing mechanism operates to rotate the platen. Return movement of the carriage permits contacts 238 to open and shaft 180, which was released for rotation when the carriage return key 241 was depressed, opens contacts 249 and breaks the holding circuit through contacts 143.

It is of course necessary that the operator who is to decode a message enciphered by the present invention must know what arrangement of pins 80 in the respective wheels 77 was used, how the Bowden wires 127 were cross connected and which of the conditioning levers 92 were initially tripped in the machine that coded the message. He must also have data that enable him to use drums 68 having random circuit connections identical with those used in coding the message and to arrange these drums in the same relative positions in the machine. This can be accomplished by prearrangement or by code symbols typed in the heading of the message.

For deciphering the coding unit is given the same identical set up as when the message was enciphered but the switch 72 is set to decoding position which is indicated by the lighting of a lamp under window 256 bearing the legend "decipher". After operating the printing unit as above described to print the heading of the message, etc., the key 25 of the coding unit bearing the first character of the coded message is depressed. The operation of the coding unit is then identical with that when the message was being enciphered except that the flow of current is through the circuits from right to left, resulting in the selection of the type bar in the printing unit bearing the same character as the key 25 of the coding unit that was operated for the corresponding character when enciphering the message. The deciphered message may be broken into units of five characters by operating the space bar 26 of the coding unit which is connected to clutch release magnet 177 of the printing unit and causes operation of shaft 180 to actuate the spacing mechanism, the automatic space insertion mechanism being inoperative when the switch 72 is set to decoding position.

We claim:

1. A ciphering unit, and a printing unit having type bars movable to print the characters carried thereby, an electromagnet individual to each said type bar to select the respective type bar for operation when such magnet is energized; said ciphering unit comprising driving means adapted to function in discrete cycles, a plurality of character keys, means operable by any one of said keys to initiate a functioning cycle of said driving means, an individual electric circuit closing means operable by each said key, a plurality of individually movable elements establishing variable random electric circuits equal in number to the number of said keys, each of said circuits being connected between some one of said circuit closing means and some one of said electromagnets, a switch settable to connect said circuits for flow of current therethrough in one direction for enciphering and in the opposite direction for deciphering, means individual to each said element to actuate such element sporadically to change said circuits, means separately controllable by actuation of each individual means to condition another of said individual means for operation, a common swingable bail actuated by said driving means to operate such of said individual means as are conditioned for operation, means controlled by said driving means common to all said keys to hold a key depressed until a type bar has been actuated and to prevent depression of any other key during that time, means operated by all of said keys to effect operating connection between said driving means and the instrumentalities actuated thereby, a member movable to lock said keys against depression, means responsive to the conditioning of said individual means to move said key locking member to the locked position when none of said individual means is conditioned for operation; said printing unit including means actuated to move said key locking member to the locked position when said printing unit does not operate in response to depression of a key, means operative when said switch is in the enciphering position to insert an extra space after each fifth character printed, means operable to lock said keys when a predetermined number of groups of five characters have been printed, and means operable simultaneously with the last-mentioned means to position the surface upon which said characters are printed to print a new character.

2. A ciphering unit, and a printing unit having type bars movable to print the characters carried thereby, an electromagnet individual to each said type bar to select the respective type bar for operation when such magnet is energized; said ciphering unit comprising driving means adapted to function in discrete cycles, a plurality of characters keys, means operable by any one of said keys to initiate a functioning cycle of said driving means, an individual electric circuit closing means operable by each said key, a plurality of individually movable elements establishing variable random electric circuits equal in number to the number of said keys, each of said circuits being connected between some one of said circuit closing means and some one of said electromagnets, a switch settable to connect said circuits for flow of current therethrough in one direction for enciphering and in the opposite direction for deciphering, means individual to each said element to actuate such element sporadically to change said circuits, means separately controllable by actuation of each individual means to condition another of said individual means for operation, a common swingable bail actuated by said driving means to operate such of said individual means as are conditioned for operation, means controlled by said driving means common to all said keys to hold a key depressed until a type bar has been actuated and to prevent depression of any other key during that time, means operated by all of said keys to effect operating connection between said driving means and the instrumentalities actuated thereby, a member movable to lock said keys against depression; said printing unit including means actuated to move said key locking member to the locked position when said printing unit does not operate in response to depression of a key, means operative when said switch is in the enciphering position to insert an extra space after each fifth character printed, and means operable to lock said keys when a predetermined number of groups of five characters have been printed.

3. A ciphering unit, and a printing unit having type bars movable to print the characters carried thereby, an electromagnet individual to each said type bar to select the respective type bar for operation when such magnet is energized; said ciphering unit comprising driving means adapted to function in discrete cycles, a plurality of character keys, means operable by any one of said keys to initiate a functioning cycle of said driving means, an individual electric circuit closing means operable by each said key, a plurality of individually movable elements establishing variable random electric circuits equal in number to the number of said keys, each of said circuits being connected between some one of said circuit closing means and some one of said electromagnets, a switch settable to connect said circuits for flow of current therethrough in one direction for enciphering and in the opposite direction for deciphering, means individual to each said element to actuate such element sporadically to change said circuits, means separately controllable by actuation of each individual means to condition another of said individual means for operation, a common swingable bail actuated by said driving means to operate such of said individual means as are conditioned for operation, means controlled by said driving means common to all said keys to hold a key depressed until a type bar has been actuated and to prevent depression of any other key during that time, means operated by all of said keys to effect operating connection between said driving means and the instrumentalities actuated thereby, a member movable to lock said keys against depression, means responsive to the conditioning of said individual means to move said key locking member to the locked position when none of said individual means is conditioned for operation, said printing unit including means operative when said switch is in the enciphering position to insert an extra space after each fifth character printed, and means operable to lock said keys when a predetermined number of groups of five characters have been printed.

4. A ciphering unit, and a printing unit having type bars movable to print the characters carried thereby, an electromagnet individual to each said type bar to select the respective type bar for operation when such magnet is energized; said ciphering unit comprising driving means adapted to function in discrete cycles, a plurality of characters keys, means operable by any one of said keys to initiate a functioning cycle of said driving means, an individual electric circuit closing means operable by each said key, a plurality of individually movable elements establishing variable random electric circuits equal in number to the number of said keys, each of said circuits being connected between some one of said circuit closing means and some one of said electromagnets, a switch settable to connect said circuits for flow of current therethrough in one direction for enciphering and in the opposite direction for deciphering, means individual to each said element to actuate such element sporadically to change said circuits, means separately controllable by actuation of each individual means to condition another of said individual means for operation, a common swingable bail actuated by said driving means to operate such of said individual means as are conditioned for operation, means controlled by said driving means common to all said keys to hold a key depressed until a type bar has been actuated and to prevent depression of any other key during that time, means operated by all of said keys to effect operating connection between said driving means and the instrumentalities actuated thereby, a member movable to lock said keys against depression; said printing unit including means operative when said switch is in the enciphering position to insert an extra space after each fifth character printed, and means operable to lock said keys when a predetermined number of groups of five characters have been printed.

5. A ciphering unit, and a printing unit having type bars movable to print the characters carried thereby, an electromagnet individual to each said type bar to select the respective type bar for operation when such magnet is energized; said ciphering unit comprising driving means adapted to function in discrete cycles, a plurality of character keys, means operable by any one of said keys to initiate a functioning cycle of said driving means, an individual electric circuit closing means operable by each said key, a plurality of individually movable elements establishing variable random electric circuits equal in number to the number of said keys, each of said circuits being connected between some one of said circuit closing means and some one of said electromagnets, a switch settable to connect said circuits for flow of current therethrough in one direction for enciphering and in the opposite direction for deciphering, means individual to each said element to actuate such element sporadically to change said circuits, means separately controllable by actuation of each individual means to condition another of said individual means for operation, a common swingable bail actuated by said driving means to operate such of said individual means as are conditioned for operation, means controlled by said driving means common to all said keys to hold a key depressed until a type bar has been actuated and to prevent depression of any other key during that time, means operated by all of said keys to effect operating connection between said driving means and the instrumentalities actuated thereby, a member movable to lock said keys against depression, means responsive to the conditioning of said individual means to move said key locking member to the locked position when none of said individual means is conditioned for operation; and means in said printing unit actuated when said printing unit does not operate in response to depression of a key to move said key locking member to the locked position.

6. A ciphering unit, and a printing unit having type bars movable to print the characters carried thereby, an electromagnet individual to each said type bar to select the respective type bar for operation when such magnet is energized; said ciphering unit comprising driving means adapted to function in discrete cycles, a plurality of character keys, means operable by any one of said keys to initiate a functioning cycle of said driving means, an individual electric circuit closing means operable by each said key, a plurality of individually movable elements establishing variable random electric circuits equal in number to the number of said keys, each of said circuits being connected between some one of said circuit closing means and some one of said electromagnets, a switch settable to connect said circuits for flow of current therethrough in one direction for enciphering and in the opposite direction for deciphering, means individual to each said element to actuate such element sporadically to change said circuits, means separately controllable by actuation of each individual means to condition another of said individual means for operation, a common swingable bail actuated by said driving means to operate such of said individual means as are conditioned for operation, means controlled by said driving means common to all said keys to hold a key depressed until a type bar has been actuated and to prevent depression of any other key during that time, means operated by all of said keys to effect operating connection between said driving means and the instrumentalities actuated thereby, a member movable to lock said keys against depression, and means responsive to the conditioning of said individual means to move said key locking member to the locked position when none of said individual means is conditioned for operation.

7. A ciphering unit, and a printing unit having type bars movable to print the characters carried thereby, an electromagnet individual to each said type bar to select the respective type bar for operation when such magnet is energized; said ciphering unit comprising driving means adapted to function in discrete cycles, a plurality of character keys, means operable by any one of said keys to initiate a functioning cycle of said driving means, an individual electric circuit closing means operable by each said key, a plurality of individually movable elements establishing variable random electric circuits equal in number to the number of said keys, each of said circuits being connected between some one of said circuit closing means and some one of said electromagnets, a switch settable to connect said circuits for flow of current therethrough in one direction for enciphering and in the opposite direction for deciphering, means individual to each said element operable by said driving means to actuate such element sporadically to change said circuits, a pair of normally open contacts common to all said random circuits, and a cam rotated by said driving means to close momentarily said contacts after actuation of said individual means ceases.

8. A printing unit, comprising a plurality of type bars movable to print the characters carried thereby, individual electrically actuated means to control the actuation of each said bar; and a controlling unit operatively connected to energize said electrically actuated means, comprising a plurality of character keys each carried by a key lever, an individual electric circuit connected to each of said electrically actuated means including elements operated by a respective one of said key levers when depressed to close such circuit, a locking projection extending upwardly from each key lever and having a laterally projecting pointed tip, all said tips being normally alined, a key lever locking bail movable to contact all of said tips, and cyclically operated means released for rotation by depression of any one of said keys so to move said bail, thereby moving said bail above the tip of the said projection connected to the depressed key to hold such key depressed until the character on the type bar then controlled by such depressed key shall have been printed and under the tips connected to all other keys to prevent depression of all said other keys until completion of the printing of such character.

9. A printing unit, comprising a plurality of type bars movable to print the characters carried thereby, individual electrically actuated means to control the actuation of each said bar; and a controlling unit operatively connected to energize said electrically actuated means, comprising a plurality of character keys each carried by a key lever, an individual electric circuit connected to each of said electrically actuated means including elements operated by a respective one of said key levers when depressed to close such circuit, a locking element connected to each said key lever, all said locking elements being normally aligned, a movable bail to contact all of said locking elements, and cyclically operted cam means released for operation by depression of any one of said keys to move said bail and engage all of said locking elements, thereby to hold such depressed key in depressed position until the character on the type bar controlled by such depressed key shall have been printed and to prevent depression of all other keys until completion of printing of such character.

10. A ciphering unit, comprising a plurality of character keys, an individual electric circuit closing means operable by each said key, a plurality of individually movable elements establishing variable random electric circuits equal in number to the number of said keys, each of said circuits being connected to some one of said circuit closing means, a member movable to lock all said keys against operation, a switch settable to cause passage of current through said circuits in one direction for enciphering and in the opposite direction for deciphering, and means acting to move said member to lock said keys when said switch is not fully moved to either the encipher or the decipher position.

11. A ciphering unit, comprising a plurality of character keys, an individual electric circuit closing means operable by each said key, a plurality of individually movable elements establishing variable random electric circuits equal in number to the number of said keys, each of said circuits being connected to some one of said circuit closing means, a member movable to lock all said keys against operation, a switch settable to cause passage of current through said circuits in one direction for enciphering and in the opposite direction for deciphering, and means acting to move said member to lock said keys when said switch is not fully moved to either the encipher or the decipher position.

12. A ciphering unit, comprising a plurality of character keys, an individual electric circuit closing means operable by each said key, a plurality of individually movable elements establishing variable random electric circuits equal in number to the number of said keys, each of said circuits being connected to some one of said circuit closing means, mechanism connected to each of said elements to move such elements individually and sporadically to change said circuits, a rotatable member individual to each said element rotated by said mechanism to select haphazardly one of said mechanisms for operation, common driving means to actuate all such mechanisms as are conditioned for operation, a selector device controlled by each said rotatable member to condition a mechanism for operation, means yieldingly holding each said rotatable member in any one of a plurality of rotational positions, a stop fixed on each of said members adjacent a predetermined point on said member defining an initial position of the member, and interconnected means operable to release all of said yielding means and to engage said stops when said members have been rotated to their respective initial positions.

13. A ciphering unit, comprising a plurality of character keys, an individual electric circuit closing means operable by each said key, a plurality of individually movable elements establishing variable random electric circuits equal in number to the number of said keys, each of said circuits being connected to some one of said circuit closing means, mechanism connected to each of said elements to move such elements individually and sporadically to change said circuits, a rotatable member individual to each said element rotated in steps by said mechanism to select haphazardly one of said mechanisms for operation, driving means connected to actuate all such mechanisms as are conditioned for operation, a selector device controlled by each said rotatable member to condition a mechanism for operation, and means powered by said driving means to effect conditioning of all such mechanisms as are selected by the respective selector device.

14. A controlling unit and a controlled unit, said controlling unit comprising a plurality of circuit closing means, an individual movable element to operate each of said circuit closing means, a plurality of rotatable drums and fixed means cooperating therewith to establish variable random electric circuits equal in number to said elements, each of said circuits being connected to some one of said circuit closing means, means to rotate said drums by steps, means to select sporadically at least one of said drums for rotation, said controlled unit comprising a plurality of selector electromagnets each connected to some one of said circuits, a movable member controlled by each said electromagnet, actuating means common to all said members to operate each said member that is selected; means to lock all said elements against operation when said controlled unit fails to respond to the operation of any said element, means to lock all said elements against operation when no drum has been selected for rotation, and means automatically acting to lock any said element in circuit closing position and simultaneously lock all other of said elements against operation until completion of response of said controlled unit to the closing of such circuit.

15. A controlling unit and a controlled unit, said controlling unit comprising a plurality of circuit closing means, an individual movable element to operate each of said circuit closing means, a plurality of rotatable drums and fixed means cooperating therewith to establish variable random electric circuits equal in number to said elements, each of said circuits being connected to some one of said circuit closing means, means to rotate said drums by steps, means to select sporadically at least one of said drums for rotation, said controlled unit comprising a plurality of selector electromagnets each connected to some one of said circuits, a movable member controlled by each said electromagnet, actuating means common to all said members to operate each said member that is selected; means to lock all said elements against operation when no drum has been selected for rotation, and means automatically acting to lock any said element in circuit closing position and simultaneously lock all other of said elements against operation until completion of response of said controlled unit to the closing of such circuit.

16. A controlling unit and a controlled unit, said controlling unit comprising a plurality of circuit closing means, an individual movable element to operate each of said circuit closing means, a plurality of rotatable drums and fixed means cooperating therewith to establish variable random electric circuits equal in number to said elements, each of said circuits being connected to some one of said circuit closing means, means to rotate said drums by steps, means to select sporadically at least one of said drums for rotation, said controlled unit comprising a plurality of selector electromagnets each connected to some one of said circuits, a movable member controlled by each said electromagnet, actuating means common to all said members to operate each said member that is selected; means to lock all said elements against operation when said controlled unit fails to respond to the operation of any said element, and means automatically acting to lock any said element in circuit closing position and simultaneously lock all other of said elements against operation until completion of response of said controlled unit to the closing of such circuit.

17. A controlling unit and a controlled unit, said controlling unit comprising a plurality of circuit closing means, an individual movable element to operate each of said circuit closing means, a plurality of rotatable drums and fixed means cooperating therewith to establish variable random electric circuits equal in number to said elements, each of said circuits being connected to some one of said circuit closing means, means to rotate said drums by steps, means to select sporadically at least one of said drums for rotation, said controlled unit comprising a plurality of selector electromagnets each connected to some one of said circuits, a movable member controlled by each said electromagnet, actuating means common to all said members to operate each said member that is selected; and power operated cam means automatically acting in response to the operation of one of the individually movable members to lock any said element in circuit closing position and simultaneously lock all other of said elements against operation until completion of response of said controlled unit to the closing of such circuit.

18. A controlling unit and a controlled unit, said controlling unit comprising a plurality of circuit closing means, an individual movable element to operate each of said circuit closing means, a plurality of rotatable drums and fixed means cooperating therewith to establish variable random electric circuits equal in number to said elements, each of said circuits being connected to some one of said circuit closing means, means to rotate said drums by steps, means to select sporadically at least one of said drums for rotation, said controlled unit comprising a plurality of selector electromagnets each connected to some one of said circuits, a movable member controlled by each said electromagnet, actuating means common to all said members to operate each said member that is selected; means to lock all said elements against operation when said controlled unit fails to respond to the operation of any said element, means to lock all said elements against operation when no drum has been selected for rotation, means automatically acting to lock any said element in circuit closing position and simultaneously lock all other of said elements against operation until completion of response of said controlled unit to the closing of such circuit, a pair of normally open contacts common to all of said circuits, and means to close momentarily said contacts upon completion of a step of rotation of any of said drums.

19. A controlling unit and a controlled unit, said controlling unit comprising a plurality of circuit closing means, an individual movable element to operate each of said circuit closing means, a plurality of rotatable drums and fixed means cooperating therewith to establish variable random electric circuits equal in number to said elements, each of said circuits being connected to some one of said circuit closing means, means to rotate said drums by steps, means to select sporadically at least one of said drums for rotation, said controlled unit comprising a plurality of selector electromagnets each connected to some one of said circuits, a movable member controlled by each said electromagnet, actuating means common to all said members to operate each said member that is selected; means automatically acting to lock any said element in circuit closing position and simultaneously lock all other of said elements against operation until completion of response of said controlled unit to the closing of such circuit, a pair of normally open contacts common to all of said random circuits, and means to close momentarily said contacts upon completion of a step of rotation of any of said drums.

* * * * *